(12) United States Patent
Hinds (10) Patent No.: US 11,763,954 B2
(45) Date of Patent: Sep. 19, 2023

(54) INTEGRATED PASSIVE COOLING CONTAINMENT STRUCTURE FOR A NUCLEAR REACTOR

(71) Applicant: GE-Hitachi Nuclear Energy Americas LLC, Wilmington, NC (US)

(72) Inventor: David H. Hinds, Wilmington, NC (US)

(73) Assignee: GE-Hitachi Nuclear Energy Americas LLC, Wilmington, NC (US)

(*) Notice: Subject to any disclaimer, the term of this patent is extended or adjusted under 35 U.S.C. 154(b) by 0 days.

(21) Appl. No.: 17/730,420

(22) Filed: Apr. 27, 2022

(65) Prior Publication Data

US 2022/0254527 A1 Aug. 11, 2022

Related U.S. Application Data

(63) Continuation of application No. 16/726,359, filed on Dec. 24, 2019, now Pat. No. 11,342,085.

(51) Int. Cl.
*G21C 13/10* (2006.01)
*G21C 15/12* (2006.01)
(Continued)

(52) U.S. Cl.
CPC .............. *G21C 15/12* (2013.01); *E04H 7/18* (2013.01); *G21C 13/028* (2013.01);
(Continued)

(58) Field of Classification Search
CPC ........ G21C 15/12; G21C 15/18; G21C 13/00; G21C 13/028; G21C 13/10; G21C 13/093; G21C 13/087
See application file for complete search history.

(56) References Cited

U.S. PATENT DOCUMENTS 3,287,226 A * 11/1966 Webb ................. G21C 9/012
976/DIG. 142
4,038,134 A * 7/1977 Dorner ................ G21C 11/088
376/288

(Continued)

FOREIGN PATENT DOCUMENTS

GB 2292476 A 2/1996
GB 2543461 B * 7/2020 ............. G21C 13/02
KR 930003059 B1 * 4/1993 ............. G21C 13/00

OTHER PUBLICATIONS

International Preliminary Report on Patentability dated Jul. 7, 2022 for corresponding International Application No. PCT/US2020/066577.

(Continued)

*Primary Examiner* — Lily C Garner
(74) *Attorney, Agent, or Firm* — Harness, Dickey & Pierce, P.L.C.

(57) ABSTRACT

An integrated passive cooling containment structure for a nuclear reactor includes a concentric arrangement of an inner steel cylindrical shell and an outer steel cylindrical shell that define both a lateral boundary of a containment environment of the nuclear reactor that is configured to accommodate a nuclear reactor and an annular gap space between the inner and outer steel cylindrical shells, a concrete donut structure at a bottom of the annular gap space, and a plurality of concrete columns spaced apart azimuthally around a circumference of the annular gap and extending in parallel from a top surface of the concrete donut structure to a top of the annular gap space. The outer and inner steel cylindrical shells and the concrete donut structure at least partially define one or more coolant channels extending through the annular gap space.

11 Claims, 6 Drawing Sheets

(51) Int. Cl.
*E04H 7/18* (2006.01)
*G21C 13/028* (2006.01)
*G21C 13/093* (2006.01)
*G21C 13/087* (2006.01)

(52) U.S. Cl.
CPC ......... *G21C 13/093* (2013.01); *G21C 13/087* (2013.01); *G21C 13/10* (2013.01)

(56) References Cited

U.S. PATENT DOCUMENTS

| | | | | |
|---|---|---|---|---|
| 4,080,256 A | * | 3/1978 | Braun | G21C 13/00 376/293 |
| 4,120,750 A | * | 10/1978 | Forster | G21C 1/328 376/394 |
| 4,213,824 A | * | 7/1980 | Jabsen | G21C 9/012 976/DIG. 186 |
| 5,049,353 A | * | 9/1991 | Conway | G21C 13/022 376/293 |
| 5,343,506 A | * | 8/1994 | Artnik | B01F 25/431 376/280 |
| 5,499,277 A | * | 3/1996 | Hunsbedt | G21C 15/18 376/290 |
| 7,245,688 B2 | * | 7/2007 | Nicholls | G21C 15/18 376/282 |
| 9,589,685 B2 | * | 3/2017 | Singh | G21C 13/02 |
| 2010/0260302 A1 | * | 10/2010 | Pelisson | G21C 9/00 376/282 |
| 2014/0321596 A1 | | 10/2014 | Singh et al. | |
| 2015/0287483 A1 | * | 10/2015 | Singh | G21C 19/04 376/299 |

OTHER PUBLICATIONS

International Search Report and Written Opinion thereof dated Jun. 4, 2021 for corresponding International Application No. PCT/US2020/066577.

* cited by examiner

INTEGRATED PASSIVE COOLING CONTAINMENT STRUCTURE FOR A NUCLEAR REACTOR

CROSS-REFERENCE TO RELATED APPLICATION

The present application is a continuation of U.S. application Ser. No. 16/726,359, filed Dec. 24, 2019, the entire contents of which is hereby incorporated herein by reference.

BACKGROUND

Field

Example embodiments described herein relate in general to nuclear reactors and in particular to providing containment and integrated passive cooling of a nuclear reactor.

Description of Related Art

Nuclear reactors may be configured to be cooled via heat transfer to one or more coolant fluids circulated in or near the nuclear reactor. Such heat transfer may be referred to herein as heat rejection by the nuclear reactor. Various coolant fluids may be utilized to remove heat from the nuclear reactor. A coolant fluid may be a fluid that includes one or more various substances, including water, liquid metal, molten salt, a gaseous substance, some combination thereof, etc.

In some nuclear plants, a nuclear reactor includes a containment system, also referred to herein as simply "containment," for managing heat rejection by the nuclear reactor by facilitating circulation of a coolant fluid, such as water, to a point in the nuclear reactor where the coolant fluid absorbs heat rejected by the nuclear reactor, and the heated coolant fluid is then circulated to a heat return, or heat sink, where the heated coolant fluid may be cooled to release the absorbed heat. In some nuclear plants, the containment system may be impacted by heat rejection that exceeds the heat transfer capabilities of a power coolant loop that is used to induce work, for example to generate electricity. Accordingly, the containment system may utilize cooling to manage containment system temperature.

In some nuclear plants, a containment system includes a physical structure, also referred to herein as a containment shell structure, that provides pressure retention so as to reduce or prevent unintended escape of gases, liquids, or any other liquids from a containment environment in which the nuclear reactor may be located.

In some nuclear plants, a structure is provided to provide structural support to one or more of the nuclear reactor, the containment system, or one or more portions of the nuclear plant, including a superstructure that is mounted vertically above the structural support in the nuclear plant.

SUMMARY

According to some example embodiments, a nuclear plant may include a nuclear reactor and an integrated passive cooling containment structure. The integrated passive cooling containment structure may include a concentric arrangement of an inner steel cylindrical shell and an outer steel cylindrical shell. An inner surface of the inner steel cylindrical shell may define a lateral boundary of a containment environment of the nuclear reactor. An outer surface of the inner steel cylindrical shell and an inner surface of the outer steel cylindrical shell may define inner and outer diameters, respectively, of an annular gap space between the inner steel cylindrical shell and the outer steel cylindrical shell. The integrated passive cooling containment structure may include a concrete donut structure at a bottom of the annular gap space, such that the concrete donut structure fills a lower region of the annular gap space. The integrated passive cooling containment structure may include a plurality of concrete columns spaced apart azimuthally around a circumference of the annular gap and extending in parallel from a top surface of the concrete donut structure to a top of the annular gap space. The outer steel cylindrical shell, the inner steel cylindrical shell, the plurality of concrete columns, and the concrete donut structure may at least partially define one or more coolant channels in the annular gap space, the one or more coolant channels extending from the top surface of the concrete donut structure to the top of the annular gap space. The outer steel cylindrical shell may include one or more coolant supply ports configured to direct coolant fluid into a bottom of the one or more coolant channels from a coolant source via one or more coolant fluid supply conduits, such that the coolant fluid rises through the one or more coolant channels towards a top of the one or more coolant channels, according to a change in coolant fluid buoyancy based on the coolant fluid absorbing heat rejected from the nuclear reactor in the containment environment via the inner steel cylindrical shell.

Two or more concrete columns, of the plurality of concrete columns, each may have a radial diameter, in a radial direction of the annular gap space, that equals a radial distance of the annular gap space between an inner diameter and an outer diameter of the annular gap space, such that the two or more concrete columns azimuthally partition the annular gap space into two or more isolated coolant channels. The outer steel cylindrical shell may include two or more coolant supply ports that are each configured to direct coolant fluid into a separate coolant channel of the two or more isolated coolant channels.

The integrated passive cooling containment structure may include one or more steel partitions isolating a concrete column of the plurality of concrete columns from an adjacent coolant channel of the one or more coolant channels.

One or more concrete columns, of the plurality of concrete columns, may have a radial diameter, in a radial direction of the annular gap space, that is less than a radial distance of the annular gap space between an inner diameter and an outer diameter of the annular gap space, such that the one or more concrete columns are isolated from directly contacting one or more of the inner steel cylindrical shell or the outer steel cylindrical shell.

The integrated passive cooling containment structure may include a cap structure that seals the top of the annular gap space to define the top of the one or more coolant channels. The cap structure may include one or more coolant outlet ports configured to direct coolant flowing to the top of the one or more coolant channels to a coolant return via one or more coolant return conduits.

The nuclear plant may further include a coolant reservoir that is both the coolant source and the coolant return.

The plurality of concrete columns and the concrete donut structure may be part of a single, uniform piece of concrete.

The plurality of concrete columns and the concrete donut structure may each include self-consolidating concrete.

The inner steel cylindrical shell and the outer steel cylindrical shell may each include corrosion resistant steel or steel coated with a corrosion resistant coating.

According to some example embodiments, an integrated passive cooling containment structure for a nuclear reactor may include a concentric arrangement of an inner steel cylindrical shell and an outer steel cylindrical shell. An inner surface of the inner steel cylindrical shell may define a lateral boundary of a containment environment of the nuclear reactor that is configured to accommodate the nuclear reactor. An outer surface of the inner steel cylindrical shell and an inner surface of the outer steel cylindrical shell may define inner and outer diameters, respectively, of an annular gap space between the inner steel cylindrical shell and the outer steel cylindrical shell. The integrated passive cooling containment structure may include a concrete donut structure at a bottom of the annular gap space, such that the concrete donut structure fills a lower region of the annular gap space. The integrated passive cooling containment structure may include a plurality of concrete columns spaced apart azimuthally around a circumference of the annular gap and extending in parallel from a top surface of the concrete donut structure to a top of the annular gap space. The outer steel cylindrical shell, the inner steel cylindrical shell, the plurality of concrete columns, and the concrete donut structure may at least partially define one or more coolant channels in the annular gap space, the one or more coolant channels extending from the top surface of the concrete donut structure to the top of the annular gap space. The outer steel cylindrical shell may include one or more coolant supply ports at a bottom of the one or more coolant channels, the one or more coolant supply ports configured to couple with a coolant source via one or more coolant fluid supply conduits, such that the one or more coolant supply ports are configured to direct a coolant fluid into a bottom region of the one or more coolant channels such that the coolant fluid rises through the one or more coolant channels towards a top of the one or more coolant channels, according to a change in coolant fluid buoyancy based on the coolant fluid absorbing heat rejected from the nuclear reactor in the containment environment via the inner steel cylindrical shell.

Two or more concrete columns, of the plurality of concrete columns, may each have a radial diameter, in a radial direction of the annular gap space, that equals a radial distance of the annular gap space between an inner diameter and an outer diameter of the annular gap space, such that the two or more concrete columns azimuthally partition the annular gap space into two or more isolated coolant channels. The outer steel cylindrical shell may include two or more coolant supply ports that are each configured to direct coolant fluid into a separate coolant channel of the two or more isolated coolant channels.

The integrated passive cooling containment structure may further include one or more steel partitions isolating a concrete column of the plurality of concrete columns from an adjacent coolant channel of the one or more coolant channels.

One or more concrete columns, of the plurality of concrete columns, may have a radial diameter, in a radial direction of the annular gap space, that is less than a radial distance of the annular gap space between an inner diameter and an outer diameter of the annular gap space, such that the one or more concrete columns are isolated from directly contacting one or more of the inner steel cylindrical shell or the outer steel cylindrical shell.

The integrated passive cooling containment structure may further include a cap structure that seals the top of the annular gap space to define the top of the one or more coolant channels. The cap structure may include one or more coolant outlet ports configured to direct coolant flowing to the top of the one or more coolant channels to a coolant return via one or more coolant return conduits.

The plurality of concrete columns and the concrete donut structure may be a single, uniform piece of concrete.

The plurality of concrete columns and the concrete donut structure may each include self-consolidating concrete.

The inner steel cylindrical shell and the outer steel cylindrical shell may each include corrosion resistant steel or steel coated with a corrosion resistant coating.

According to some example embodiments, a method for forming an integrated passive cooling containment structure for a nuclear reactor may include forming a steel annulus structure. The steel annulus structure may include a concentric arrangement of an inner steel cylindrical shell and an outer steel cylindrical shell. An inner surface of the inner steel cylindrical shell may define a lateral boundary of a containment environment of the nuclear reactor. An outer surface of the inner steel cylindrical shell and an inner surface of the outer steel cylindrical shell may define inner and outer diameters, respectively, of an annular gap space between the inner steel cylindrical shell and the outer steel cylindrical shell. The method may include forming a concrete donut structure at a bottom of the annular gap space, such that the concrete donut structure fills a lower region of the annular gap space. The method may include forming a plurality of concrete columns spaced apart azimuthally around a circumference of the annular gap space and extending in parallel from a top surface of the concrete donut structure to a top of the annular gap space, such that the outer steel cylindrical shell, the inner steel cylindrical shell, the plurality of concrete columns, and the concrete donut structure at least partially define one or more coolant channels in the annular gap space, the one or more coolant channels extending from the top surface of the concrete donut structure to the top of the annular gap space. The method may include installing one or more coolant supply ports at a bottom of the one or more coolant channels, the one or more coolant supply ports configured to couple with a coolant source via one or more coolant fluid supply conduits, such that the one or more coolant supply ports are configured to direct a coolant fluid into a bottom region of the one or more coolant channels such that the coolant fluid rises through the one or more coolant channels towards a top of the one or more coolant channels, according to a change in coolant fluid buoyancy based on the coolant fluid absorbing heat rejected from the nuclear reactor in the containment environment via the inner steel cylindrical shell. The forming the steel annulus structure may include installing one or more steel partitions in the annular gap space to define an inner laterally-closed space, that extends from the top surface of the concrete donut structure to the top of the annular gap space, within the annular gap space. The forming the plurality of concrete columns may include filling the inner laterally-closed space with concrete to form one concrete column of the plurality of concrete columns.

The method may further include mounting the nuclear reactor in the containment environment such that the nuclear reactor is structurally supported in the containment environment by the integrated passive cooling containment structure via at least the concrete donut structure.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

It will be understood that a "nuclear reactor" as described herein may include any or all of the well-known components of a nuclear reactor, including a nuclear reactor core with or without nuclear fuel components, control rods, or the like. It will be understood that a nuclear reactor as described herein may include any type of nuclear reactor, including but not limited to a Boiling Water Reactor (BWR), a Pressurized Water Reactor (PWR), a liquid metal cooled reactor, a Molten Salt Reactor (MSR), or the like. As described herein, a nuclear reactor may include an Advanced Boiling Water Reactor (ABWR), an Economic Simplified Boiling Water Reactor (ESBWR), a BWRX-300 reactor, or the like.

It will be understood that a "coolant fluid" as described herein may include any well-known coolant fluid that may be used in cooling any part of a nuclear plant and/or nuclear reactor, including water, a liquid metal (e.g., liquid sodium), a gas (e.g., helium), a molten salt, any combination thereof, or the like. It will be understood that a "fluid" as described herein may include a gas, a liquid, or any combination thereof.

The present disclosure relates to a unique containment structure for providing containment of a nuclear reactor in a nuclear plant (e.g., mitigating or preventing escape of gases, liquids, and/or other materials from a containment environment, in which the nuclear reactor is located, to an external environment that is external to the containment structure), and simultaneously providing structural support for the nuclear reactor and/or at least some of a superstructure of the nuclear plant (e.g., a portion of the structure of the nuclear plant that is located vertically above the containment structure and may also be located vertically above the nuclear reactor) and further providing a passive cooling capability (e.g., a cooling capability that is not driven by energy consumption, such as operation of a flow generator device, e.g., a pump, to induce or maintain a flow of coolant fluid). The containment, structural support, and passive cooling are thus integrated into a single structure: an integrated passive cooling containment structure, which is referred to herein as simply the "containment structure."

The passive cooling capability may be provided via the containment structure including one or more coolant channels within an interior annular gap space of the containment structure, where the one or more coolant channels are partially or completely defined by the structure of the containment structure and are configured to enable coolant fluid in the coolant channels to rise from an inlet at a bottom of the coolant channel to an outlet at a top of the coolant channel due to a natural flow current (e.g., not induced by active flow generators such as pumps), for example as a result of the coolant fluid introduced ("supplied," "directed," etc.) into the bottom region of a coolant channel absorbing heat rejected from the nuclear reactor and experiencing increased buoyancy (e.g., reduced density) due to being heated, such that the heated coolant fluid rises through the coolant channel towards an outlet at a top of the coolant channel and is displaced by colder (e.g., denser and less buoyant) coolant fluid newly-introduced into the bottom region $160c$ of the coolant channel via the inlet.

The integrated passive cooling containment structure, referred to herein as simply the "containment structure," may include a concentric arrangement of inner and outer steel cylindrical shells that define an annular gap space therebetween, with a concrete donut structure at a bottom of the annular gap space and a plurality of concrete columns extending, vertically and in parallel, through the annular gap space from the top surface of the concrete donut structure to the top of the annular gap space, where the plurality of concrete columns are azimuthally spaced apart around a center axis of the containment structure and within the annular gap space to form a "ring" pattern of concrete columns. The concrete columns may extend beyond the top of the annular gap space, which is defined by the top edges of the inner and outer steel cylindrical shells, or may extend to the top of the annular gap space, but example embodiments are not limited thereto. The inner steel cylindrical shell may at least partially define the containment environment for the nuclear reactor as the space defined by, and thus laterally ("horizontally") surrounded by the inner surface of the inner steel cylindrical shell. Structural support may be provided by some or all of the concrete donut structure, the concrete columns, and the inner and outer steel cylindrical shells. The concrete donut structure, alone or in combination with one or both of the inner and outer steel cylindrical shells, may provide structural support of the nuclear reactor that is in the containment environment. Additionally, the inner and outer steel cylindrical shells, concrete columns, and/or concrete donut structure may provide at least a portion of structural support of a superstructure of the nuclear plant that is vertically above the containment structure.

The containment structure may be a steel-concrete composite structure, as the term "steel-concrete composite structure" (SC) is well-known, for example within the American Concrete Institute (ACI), American Society of Civil Engineers (ASCE), and the like, to refer to a structure that comprises a concrete structure and a steel structure. In some example embodiments, the containment structure may be an SC containment structure based on including a concrete donut structure and concrete columns within an annular gap space that is defined between concentrically arranged inner and outer steel cylindrical shells. The SC containment structure may provide improved efficiency of construction, as the concrete portions (e.g., the donut structure and the columns) of the SC containment structure may be formed without using concrete "formwork" structures to define the shapes of some or all of the concrete structures. For example, the concrete donut structure may be formed by simply filling the annular gap space defined between the inner and outer steel cylindrical shells up to a particular height, and the concrete columns may be pre-formed off-site and then installed within the annular gap space, formed within one or more inner spaced in the annular gap space that are defined by one or more steel partitions, or the like. Additionally, the SC containment structure may have improved size/volume efficiency and/or structural support strength based on being a SC structure, in addition to providing the integration of passive cooling, structural support, and pressure retention in a single structure.

Figure 1:
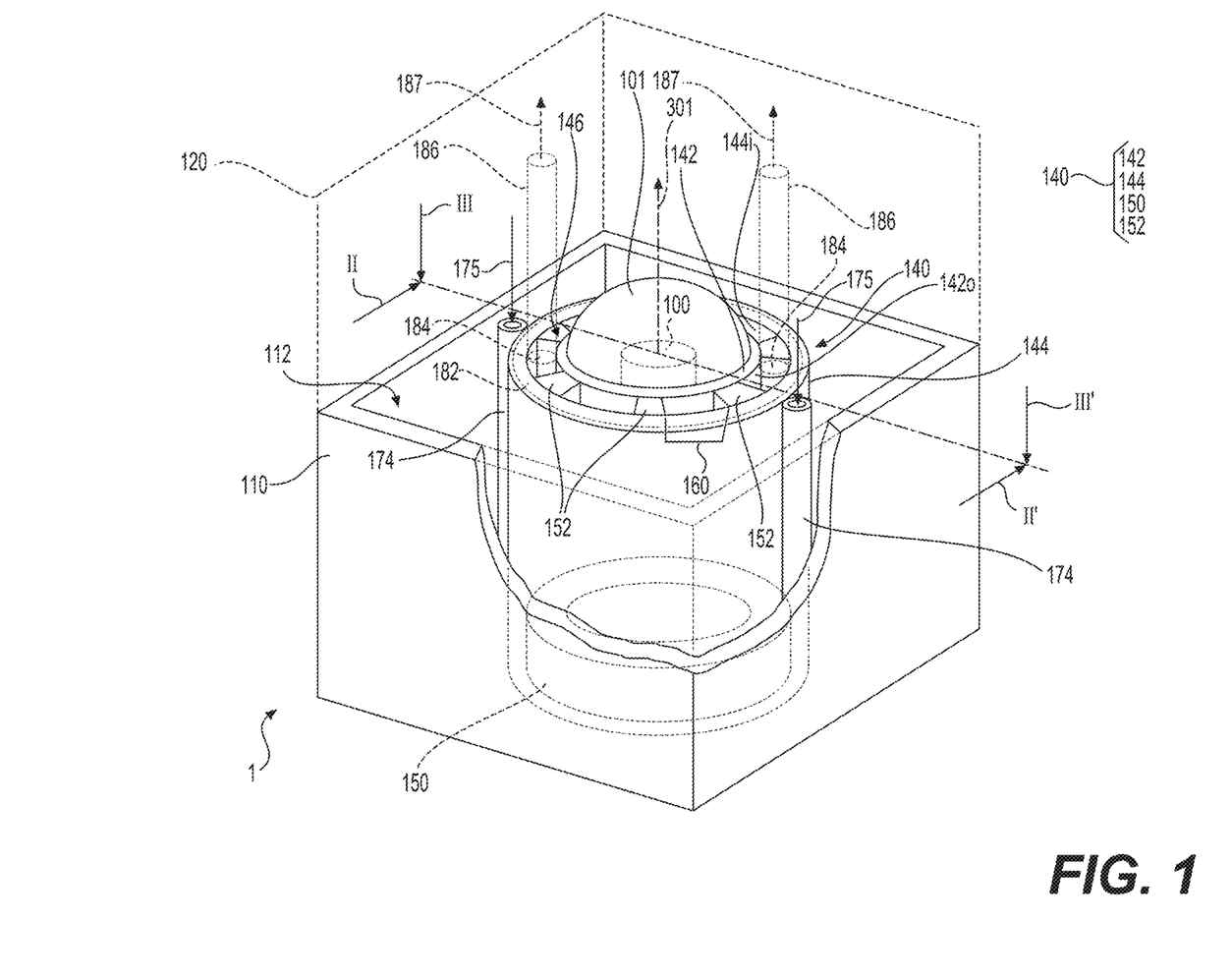
FIG. 1 is a schematic view of a nuclear plant that includes an integrated passive cooling containment structure, according to some example embodiments.
Figure 2:
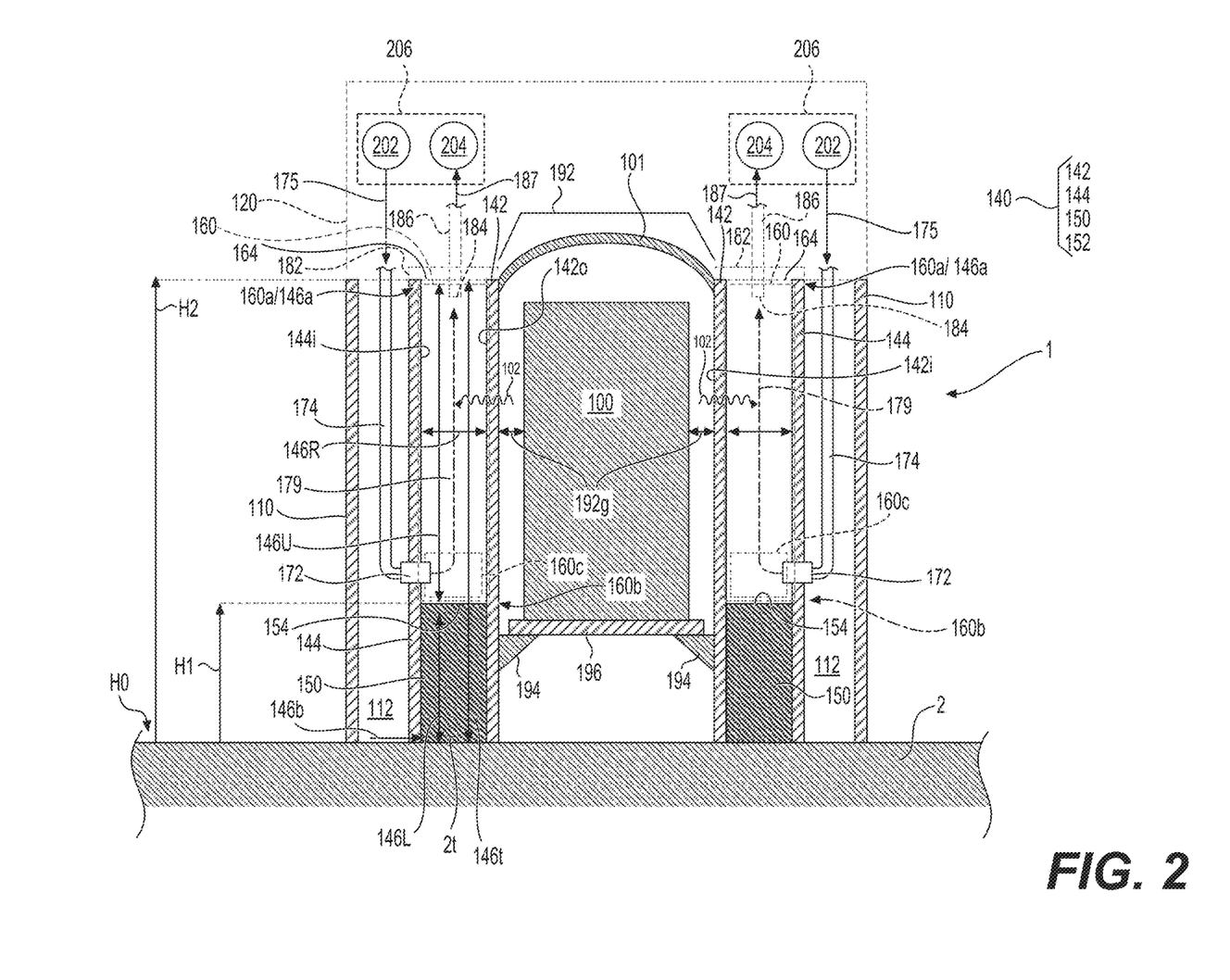
FIG. 2 is a cross-sectional side view of the nuclear plant of FIG. 1 along cross-sectional view line II-II', according to some example embodiments.
Figure 3:
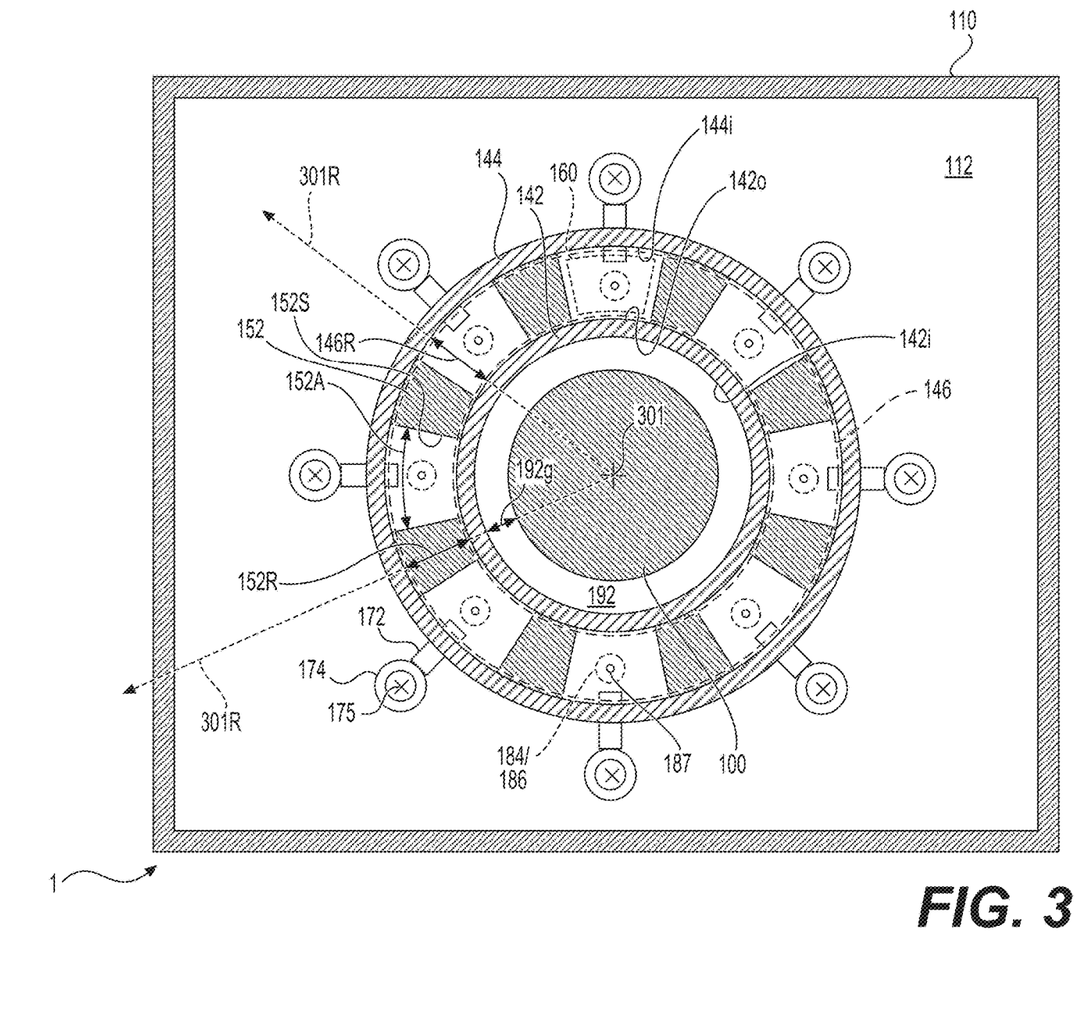
FIG. 3 is a cross-sectional top view of the nuclear plant of FIG. 1 along cross-sectional view line III-III' where the integrated passive cooling containment structure includes support columns with radial widths that equal the radial distance of the annular gap between the inner diameter and outer diameter of the inner channels of the integrated passive cooling containment structure, according to some example embodiments.

FIG. 1 is a schematic view of a nuclear plant that includes an integrated passive cooling containment structure, according to some example embodiments. FIG. 2 is a cross-sectional side view of the nuclear plant of FIG. 1 along cross-sectional view line II-II', according to some example embodiments. FIG. 3 is a cross-sectional top view of the nuclear plant of FIG. 1 along cross-sectional view line III-III' where the integrated passive cooling containment structure includes support columns with radial widths that equal the radial distance of the annular gap between the inner diameter and outer diameter of the inner channels of the integrated passive cooling containment structure, according to some example embodiments.

Referring to FIGS. 1-3, the nuclear plant 1 includes a reactor building structure 110 (e.g., reactor building outer load-bearing walls) that encompasses a nuclear reactor 100, a containment structure 140, a void space 112 defined between the exterior of the containment structure 140 and the reactor building structure 110, and a superstructure 120 that is located vertically above the containment structure 140, the nuclear reactor 100, or a combination thereof. It will be understood that the nuclear reactor 100 and containment structure 140 may be within an interior of the reactor building structure 110. The nuclear plant 1 rests on a foundation 2 (which may be the ground, bedrock, a structural foundation, any combination thereof, or the like).

As shown in FIGS. 1-3, the nuclear reactor 100 is located within a containment environment 192 that is at least laterally (e.g., horizontally) surrounded by, and at least laterally defined by the containment structure 140. The containment structure 140 may further include the cap structure 101 that spans over, covers, and defines a top of the containment environment 192. The nuclear reactor 100 may be coupled to a primary, coolant fluid circulation loop (not shown) that is configured to circulate coolant fluid into and out of the nuclear reactor for the purpose of converting heat rejected by the nuclear reactor 100 into mechanical work (e.g., spinning a turbine to generate electrical power). Such a coolant loop, referred to herein as the power coolant loop, is separate from the coolant fluid flow and/or circulation illustrated in the drawings and described herein with regard to one or more coolant channels of the containment structure 140.

As shown in FIGS. 1-3, the containment structure 140 includes a concentric arrangement of an inner steel cylindrical shell 144 and an outer steel cylindrical shell 142 that are coaxial with respect to central longitudinal axis 301, where axis 301 is also a longitudinal axis of the containment structure 140. The inner surface 142i of the inner steel cylindrical shell 142 defines at least a lateral (e.g., side) boundary of the containment environment 192, within which the nuclear reactor 100 may be located and contained. An outer surface 142o of the inner steel cylindrical shell 142 and an inner surface 144i of the outer steel cylindrical shell 144 may define inner and outer diameters, respectively, of an annular gap space 146 between the inner steel cylindrical shell 142 and the outer steel cylindrical shell 144. Thus, the outer surface 142o of the inner steel cylindrical shell 142 and the inner surface 144i of the outer steel cylindrical shell 144 may collectively define an annular gap space 146 that has a longitudinal axis that is axis 301. It will be understood that the bottom 146b of the annular gap space 146 may be defined by the plane that is coplanar with one or both of the bottom surfaces, or edges, of the inner and outer steel cylindrical shells 142, 144 and/or the top surface 2t of the foundation 2, and the top 146a of the annular gap space 146 may be defined by the plane that is coplanar with one or both of the top surfaces, or edges, of the inner and outer steel cylindrical shells 142, 144. The inner and outer steel cylindrical shells 142, 144 may collectively, alone or in further combination with one or more steel partitions 156 as described further below with reference to FIG. 4, be referred to as a "steel annulus structure."

In some example embodiments, the inner and/or outer steel cylindrical shells 142, 144 may comprise, in part or in full, any well-known corrosion resistant steel material, including, for example, "stainless steel" as the term is well-known. In some example embodiments, the inner and/or outer steel cylindrical shells may comprise, in part or in full, any well-known steel material (e.g., "carbon steel" as the term is well-known) that is coated with any well-known corrosion resistant coating.

Still referring to FIGS. 1-3, the containment structure 140 further includes a concrete donut structure 150 at the bottom 146b of the annular gap space 146 such that the concrete donut structure 150 fills a lower region 146L of the annular gap space. As shown, the concrete donut structure 150 may extend in a ring, or "donut" shape around the entire circumference of the lower region 146L of the annular gap space 146. As shown in FIG. 2, it will be understood that the lower region 146L may be defined as the portion of the annular gap space 146 that is entirely filled by the concrete donut structure 150, such that a vertical height of the lower region 146L extends from the bottom 146b of the annular gap space 146 to a height of the top surface 154 of the concrete donut structure. As shown in FIG. 2, it will be understood that the upper region 146U of the annular gap space 146 is the portion of the annular gap space 146 that excludes the lower region 146L and a total vertical height of the upper region 146U of the annular gap space 146 extends from the top surface 154 of the concrete donut structure 150 to the top 146a of the annular gap space 146.

It will be understood that the total vertical height of the lower region 146L of the annular gap space 146 may be between about 10% and about 50%, for example about 33%, of the vertical height 146T (e.g., height from height H0 to H2) of the annular gap space 146.

As shown in FIG. 2, it will be understood that the bottom 146b of the annular gap space 146, as well as the bottom surfaces and/or edges of the inner and outer steel cylindrical shells 142, 144, is at a height H0 that is the height of the top surface 2t of the foundation 2. Additionally, the top surface 154 of the concrete donut structure 150, and thus the top of the lower region 146L of the annular gap space 146 and the bottom of the upper region 146U of the annular gap space 146 (and also the bottom 160b of the one or more coolant channels 160 described further below) is at a height H1 above the top surface 2t of the foundation 2. Additionally, the top surfaces and/or edges of the inner and outer steel cylindrical shells 142, 144, and thus the top 146a of the annular gap space 146 (and also the top 160a of the one or more coolant channels 160 described further below) is at a height H2 above the height of the top surface 2t of the foundation 2.

As shown in FIG. 2, the concrete donut structure 150 may completely fill the lower region 146L at the bottom 146b of the annular gap space 146, such that no voids, or substantially no voids (e.g., no voids within manufacturing tolerances and/or material tolerances) remain in the lower region 146L of the annular gap space 146 that extends between the bottom 146b of the annular gap space 146 and the top surface 154 of the concrete donut structure 150. In some example embodiments, the concrete donut structure 150 may comprise, in part or in full, any well-known self-consolidating concrete material, so that the presence of voids within the concrete donut structure may be reduced or minimized.

As shown in FIG. 2, the inner surface 142i of the inner steel cylindrical shell 142 may be coupled to one or more support projections 194 (e.g., wedge structures) that project into the containment environment 192 and support a pedestal 196 in the containment environment 192. As shown in FIG. 2, the nuclear reactor 100 may be mounted on, and thus may rest upon, the pedestal. In some example embodiments, the one or more support projections 194 may be connected directly to the inner surface 142i of the inner steel cylindrical shell 142 and thus may be connected indirectly to the concrete donut structure 150. In some example embodiments, the one or more support projections 194 may extend through the inner steel cylindrical shell 142 to be directly connected to the concrete donut structure 150. Accordingly, containment structure 140 may be configured to transfer the structural load (e.g., weight) of the nuclear reactor 100 to the foundation 2 via at least the concrete donut structure 150 through the one or more support projections. As a result, the concrete donut structure 150, and thus the containment structure 140, may provide structural support of the nuclear reactor 100 within the containment environment 192.

As shown in FIG. 2, the nuclear reactor 100 may be spaced apart from the inner steel cylindrical shell 142 by a gap space 192g within the containment environment 192, but example embodiments are not limited thereto.

As shown in FIGS. 1 and 3, the containment structure 140 includes a plurality of concrete columns 152 that are azimuthally spaced 152A apart, within the annular gap space 146, around the circumference of the annular gap space 146 and each extend vertically, and in parallel with each other, through at least the upper region 146U of the annular gap space 146, from the top surface 154 of the concrete donut structure 150 to the top 146a of the annular gap space 146. The concrete columns 152 may be equally azimuthally spaced apart 152A around the circumference of the annular gap space 146, but example embodiments are not limited thereto, and in some example embodiments, the concrete columns 152 may be symmetrically or asymmetrically arranged around the circumference of the annular gap space 146, for example so that one or more concrete columns 152 may be provide additional radiation shielding of certain portions and/or areas of the nuclear reactor 100. In some example embodiments, one or more, or all, of the concrete columns 152 may comprise, in part or in full, any well-known self-consolidating concrete material, so that the presence of voids within the concrete columns 152 may be reduced or minimized. In some example embodiments, the concrete donut structure 150 and one or more, or all, of the concrete columns 152 are part of a single, uniform piece of concrete, but example embodiments are not limited thereto, and the concrete columns 125 may be separate pieces of concrete that are separately formed on the top surface 154 of the concrete donut structure 150. In some example embodiments, one or more concrete columns 152 may extend vertically into an interior of the concrete donut structure 150, such that a bottom surface of the one or more concrete columns 152 is located vertically below the top surface 154 of the concrete donut structure 150.

Based on including the inner and outer steel cylindrical shells 142, 144, the concrete donut structure 150, and the concrete columns 152, the containment structure 140 may be understood to be a steel-concrete composite (SC) containment structure.

As shown in FIGS. 1-2, the containment structure 140 may include a cap structure 101 that spans over, and thus covers and defines, a top of the containment environment 192.

In some example embodiments, the concrete columns 152 and the inner and outer steel cylindrical shells 142, 144 may collectively provide structural support to at least a portion of the superstructure 120 of the nuclear plant 1 that is vertically above the containment structure 140 and the nuclear reactor 100. As shown in FIGS. 1-2, the concrete columns 152 and the inner and outer steel cylindrical shells 142, 144 may collectively provide structural support of the superstructure 120 in combination with the reactor building structure 110 (e.g., outer load-bearing walls). In some example embodiments, the reactor building structure 110 are not load-bearing walls, and the concrete columns 152 and the inner and outer steel cylindrical shells 142, 144 may collectively provide all of the structural support of the superstructure 120.

Referring to FIG. 2, in some example embodiments, some (e.g., two or more) or all of the concrete columns 152 may have a radial diameter 152R, in a radial direction 301R of the annular gap space 146 that is the radial direction 301R from the central axis 301, that equals a radial distance 146R of the annular gap space 146 between an inner diameter (defined by the outer surface 142o) and an outer diameter (defined by the inner surface 144i) of the annular gap space 146, such that the two or more concrete columns 152 azimuthally partition the annular gap space 146 into two or more isolated coolant channels 160. As a result, two or more concrete columns 152 may extend completely between the outer and inner surfaces 142o and 144i (and thus be in direct contact with each of the outer and inner surfaces 142o and 144i), throughout some or all of the vertical height of the upper region 146U of the annular gap space 146, and thus each such concrete column 152 may azimuthally partition the annular gap space 146. As shown in FIG. 3, where two or more concrete columns 152 have a radial diameter 152R that equals the radial distance 146R, the two or more concrete columns 152 may partition the annular gap space 146 into two or more (e.g., a plurality) of coolant channels 160 that extend vertically through the annular gap space 146, where each coolant channel 160 is defined by at least the top surface 154 of the concrete donut structure 150, the inner and outer surfaces 144i, 142o, and one or more side surfaces 152s of one or more concrete columns 152. While the concrete columns are shown in FIGS. 1-3 as having polygonal cylinder shapes, the example embodiments are not limited thereto, and one or more concrete columns may have a circular cylinder shape or any type of cylinder shape.

In some example embodiments, including the example embodiments shown in FIGS. 1-3, the radial distance 146R and the radial diameter 152R of one or more concrete columns 152 may be a fixed value over an entirety of the vertical distance and/or vertical length of the annular gap space 146 and/or concrete columns 152. Accordingly, a concrete column 152 may have a radial diameter 152R that equals the radial distance 146R along the entire vertical length of the concrete column 152 such that the concrete column 152 partitions the annular gap space 146 along an entire vertical length of the concrete column 152. It will be understood that a concrete column that "partitions" the annular gap space 146 may completely block fluid (e.g., coolant fluid) flow through a conduit that is at least partially defined by a side surface 152s of the concrete column 152.

As will be further described below, in some example embodiments one or more concrete columns 152 may not partition the annular gap space 146 into multiple coolant channels 160, such that the containment structure 140 may include a coolant channel 160 that encompasses one or more concrete columns 152 within the annular gap space 146.

As shown in FIGS. 1-2, the one or more coolant channels 160 may have a bottom 160b that is at least partially defined by the top surface 154 of the concrete donut structure 150 (e.g., a bottom of at least a portion of the upper region 146U of the annular gap space 146) and a top 160a that is at least partially defined by the top surfaces and/or edges of the outer and inner steel cylindrical shells 144, 142 and thus may be the same as at least a portion of the top 146a of the annular gap space 146.

Referring now to FIGS. 1-3, the containment structure 140 may include one or more coolant supply ports 172 (e.g., inlet fluid ports, orifices, etc.) that may extend through the thickness of the outer steel cylindrical shell 144 (and thus may be understood to be included in the outer steel cylindrical shell 144) and into one or more coolant channels 160 defined within the annular gap space 146. As shown in FIGS. 1-3, each coolant supply port 172 may be located at (e.g., proximate to) the bottom 160b of the coolant channel 160 into which the coolant supply port 172 extends. As shown in FIG. 2, a coolant supply port 172 may be coupled to a coolant supply conduit 174 that is further coupled to a coolant source 202, and thus the coolant supply port 172 may be configured to direct a supply coolant fluid 175, that is received at the coolant supply port 172 from the coolant source 202 via the coolant supply conduit 174, into the coolant channel 160 at the bottom 160b thereof. It will be understood that directing and/or supplying the supply coolant fluid 175 into a portion of the coolant channel 160 that is at (e.g., proximate to) a bottom 160b of the coolant channel 160 may be referred to herein as directing and/or supplying the supply coolant fluid 175 into a bottom region 160c of the coolant channel 160. It will be understood that directing and/or supplying the supply coolant fluid 175 into a portion of the coolant channel 160 that is at (e.g., proximate to) a bottom 160b of the coolant channel 160 may be referred to herein as directing and/or supplying the supply coolant fluid 175 "into" a bottom region 160c of the coolant channel 160 (e.g., a region of the coolant channel 160 that is a bottom 10% of the coolant channel 160 extending upwards from the top surface 154 at height H1, a region of the coolant channel 160 that is a bottom 5% of the coolant channel 160 extending upwards from the top surface 154 at height H1, or the like).

As further shown in FIG. 2, the supply coolant fluid 175 that is supplied into the bottom region 160c of a coolant channel 160 may absorb heat 102, that is rejected from the nuclear reactor 100 via at least the inner steel cylindrical shell 142 (and the gap space 192g in example embodiments where the gap space 192g is not absent), to become heated coolant fluid 179. The heated coolant fluid 179 may have increased buoyancy (e.g., reduced density) over the supply coolant fluid 175 that is supplied into the bottom region 160c of the coolant channel 160, and thus the heated coolant fluid 179 may rise (e.g., flow vertically upwards) through the coolant channel 160 towards a top 160a of the coolant channel 160 (which may also be the top 146a of the annular gap space 146).

In some example embodiments, the containment structure 140 includes a cap structure 182 that covers (e.g., seals) the top 146a of the annular gap space 146 and thus defines the top 160a of the one or more coolant channels 160 in the annular gap space 146. In some example embodiments, the cap structure 182 and the cap structure 101 may be part of a single, uniform piece of material. In some example embodiments, a coolant return port 184 may extend through the thickness of the cap structure 182 to the top 160a of the coolant channel 160 and may be further coupled to a coolant return conduit 186 that is further coupled to a coolant return 204. The coolant return port 184 may thus be configured to direct the heated coolant fluid 179 that rises to the top 160a of the coolant channel 160 to flow through the coolant return port 184 and thus through the coolant return conduit 186, as return coolant fluid 187, to the coolant return 204. As shown in FIG. 2, the coolant source 202 and the coolant return 204 may be a single, common coolant fluid reservoir 206 (e.g., a coolant fluid pool) that is configured to provide a (at least temporary) heat sink of heat 102 removed from the containment environment 192 by the coolant fluid circulating between the reservoir 106 and the one or more coolant channels 160, but example embodiments are not limited thereto.

As shown in at least FIG. 2, the flow (e.g., circulation) of supply coolant fluid 175, 179, 187 through a coolant channel 160 and thus between the coolant source 202 and coolant return 204 (which may be a single coolant fluid reservoir 206) may be driven by the upwards flow of the heated coolant fluid 179 within the coolant channel 160 as a result of absorbing rejected heat 102, so as to be displaced by newly-supplied supply coolant fluid 175 and thus maintain the circulation or flow of coolant fluid through the coolant channel 160. As a result, the flow of coolant fluid through one or more coolant channels 160 of the containment structure 140 may be understood to be "passive," as the flow is not induced or controlled by an active flow generator device (e.g., a pump) but is instead induced and/or controlled by (e.g., driven by) the absorbance of heat 102 from nuclear reactor at the coolant fluid within the one or more coolant channels 160, and thus may be driven by the natural difference in buoyancy (e.g., density) of heated coolant fluid 179 over the buoyancy (e.g., density) of colder supply coolant fluid 175.

As shown in FIGS. 1-3, the containment structure 140 may provide a relatively compact (e.g., volume efficient) passive cooling capability, via coolant channel(s) 160) that are integrated into the interior of the containment structure 140, thereby reducing or preventing leaks of substances from the containment structure 140 and improving volume efficiency of a containment structure that provides passive cooling, structural support, and pressure retention. It will be understood that the containment structure 140 is configured to be leak-tight and water-tight with regard to fluid flow or leakage from the containment environment 192 to the annular gap space 146 and/or from the annular gap space 146 to an exterior of the containment structure 140 (e.g., the void space 112) and thus an exterior of the reactor building structure 110 and/or an exterior of the nuclear plant 1.

In some example embodiments, the containment structure 140 is configured to provide mitigation and/or prevention of the escape of gases, liquid, and/or other substances from the containment environment 192 to an environment external to the containment structure 140 (e.g., the void space 112 and/or an exterior of the reactor building structure 110). The containment structure 140 may thus be understood to be configured to be leak-resistant and/or leak-proof with regard to liquids, gases, or other substances in the containment environment 192.

As shown in FIG. 3, where the annular gap space 146 is partitioned into multiple separate, azimuthally-spaced apart coolant channels 160 by two or more concrete columns 152, the outer steel cylindrical shell 144 may include multiple coolant supply ports 172, where each separate coolant supply port 172 extends into a separate coolant channel 160 and thus each separate coolant supply port 172 is configured to direct coolant fluid (e.g., supply coolant fluid 175) into a separate coolant channel 160. Still referring to FIG. 3, in some example embodiments, the cap structure 182 may include multiple separate coolant return ports 184 that each extend into the top 160a of a separate coolant channel 160.

In some example embodiments, two or more concrete columns 152 may have a radial diameter 152R that varies with vertical height, such that the two more concrete columns 152 have a base that is wider than a top of the two or more concrete columns. Accordingly, in some example embodiments, the radial diameter 152R of the two or more concrete columns 152 equals the radial distance 146R at the base of the two or more concrete columns 152 (e.g., at the bottom 160b of the coolant channels 160, the two or more concrete columns 152 may partition the annular gap space 146 into separate bottoms 160b of a coolant channel 160, and the radial diameter 152R of the two or more concrete columns may be less than the radial distance 146R at the top of the two or more concrete columns 152, and the cap structure 182 may include a smaller quantity of coolant return ports 184 than the quantity of coolant supply ports 172.

Still referring to FIGS. 1-3, as shown, the coolant supply conduit(s) 174 may extend through the void space 112, external to the containment structure 140, but example embodiments are not limited thereto.

Figure 4:
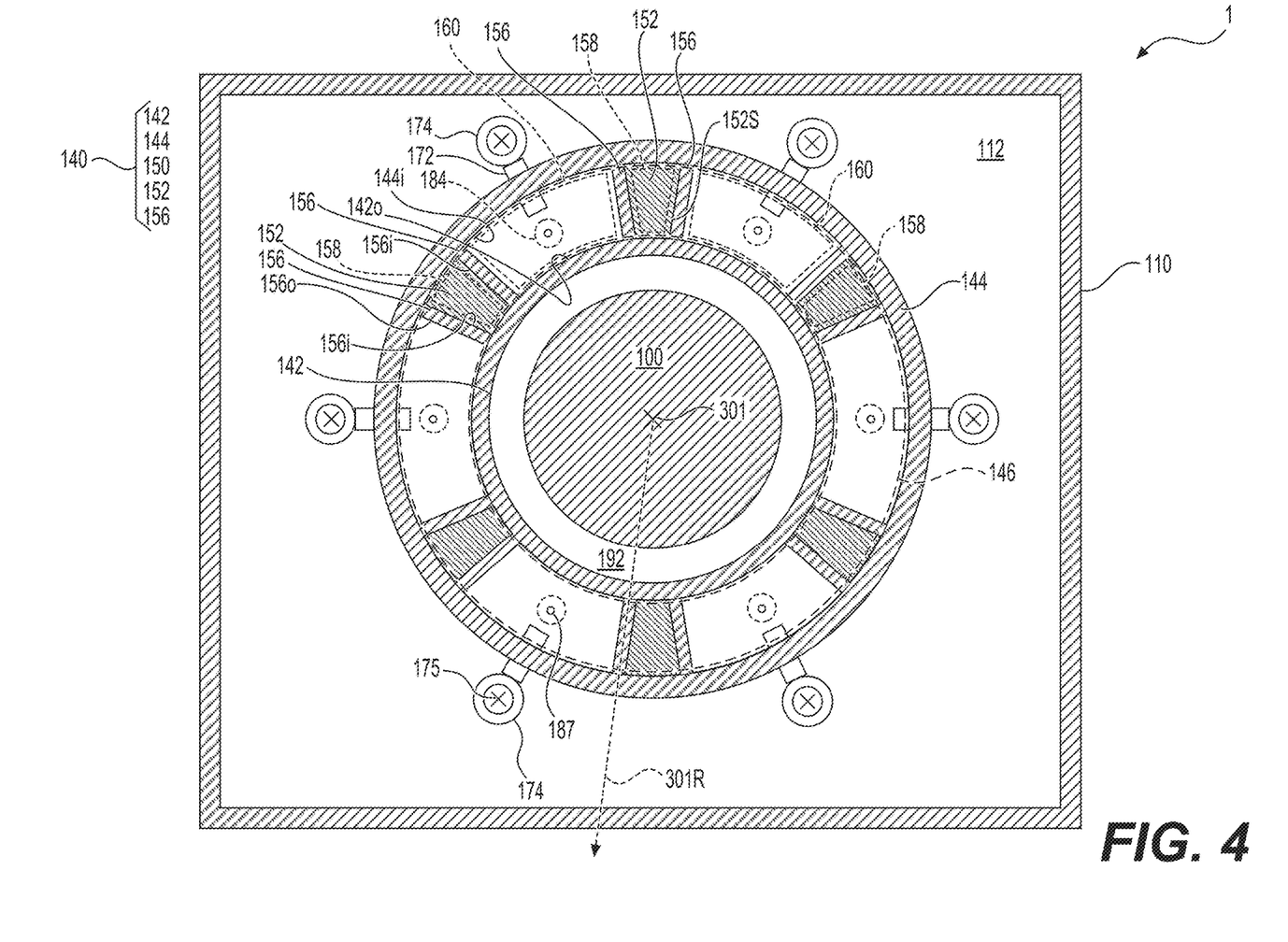
FIG. 4 is a cross-sectional top view of the nuclear plant of FIG. 1 along cross-sectional view line III-III' where the integrated passive cooling containment structure includes support columns formed between opposing steel partitions in the annular gap of the integrated passive cooling containment structure, according to some example embodiments.

FIG. 4 is a cross-sectional top view of the nuclear plant of FIG. 1 along cross-sectional view line III-III' where the integrated passive cooling containment structure includes support columns formed between opposing steel partitions in the annular gap of the integrated passive cooling containment structure, according to some example embodiments. It will be understood that like elements from FIGS. 1-3 have the same reference numbers in FIG. 4. Elements of the example embodiments shown in FIG. 4 that are the same or substantially the same as the corresponding like elements shown in any of FIGS. 1-3 will not be described again in detail with regard to FIG. 4 and the above description thereof with regard to any of FIGS. 1-3 will be understood to apply to the example embodiments shown in FIG. 4.

Referring to FIG. 4, in some example embodiments, the containment structure 140 may include one or more steel partitions 156 that extend between the outer surface 142o of the inner steel cylindrical shell 142 and the inner surface 144i of the outer steel cylindrical shell, along some or all of the vertical height 146T of the annular gap space 146. While FIG. 4 illustrates embodiments where the steel partitions 156 extend in the radial direction 301R from axis 301, example embodiments are not limited thereto.

As shown in FIG. 4, one or more steel partitions 156 may azimuthally partition the annular gap space 146. As further shown, one or more steel partitions 156 may isolate a concrete column 152 from an adjacent coolant channel 160. In some example embodiments, a concrete column 152 may be isolated from direct contact with (e.g., from defining) any adjacent coolant channel 160 based on the side surfaces 152s of the concrete column 152 that are exposed from the inner and outer steel cylindrical shells 142, 144 being completely covered by one or more steel partitions 156, such that opposite steel partitions 156 may cover opposite exposed side surfaces 152s of a concrete column 152 and may define at least a portion of separate, adjacent coolant channels 160.

In some example embodiments, the steel partitions 156 may enable the efficient formation of the concrete columns 152 as part of construction of the containment structure 140, such that the containment structure that is a SC containment structure may be constructed without utilizing any concrete formwork. As shown in FIG. 4, opposing steel partitions 156 may define an inner laterally-closed space 158 that is bounded by, and thus defined by, the outer surface 142o, the inner surface 144i, and opposing inner surfaces 156i of the opposing steel partitions 156.

As noted above with regard to FIGS. 1-3, the concrete donut structure 150 may be formed based on filling a portion of the annular gap space 146 with concrete (e.g., self-consolidating concrete). Subsequently, or at the same time as the concrete donut structure 150 is being formed via such filling, the one or more inner laterally-closed spaces 158 that are at least partially defined by opposing inner surfaces 156i of opposing steel partitions 156 (e.g., a set of steel partitions 156) may be partially or fully filled with concrete (e.g., filled with concrete to a top of the annular gap space 146) to form the concrete columns 152 within the annular gap space 146.

In some example embodiments, one or more steel partitions 156 may extend vertically from height H2 down to H1 but not down to height H0, such that, such that the concrete donut structure 150 may be a single, uniform piece of concrete that completely fills the annular gap space up to at least a height of a bottom edge of one or more steel partitions 156. In some example embodiments, one or more steel partitions 156 may extend vertically from height H2 down to H1 such that the concrete donut structure 150 may be a single, uniform piece of concrete that completely fills the annular gap space up to height H1. In some example embodiments, one or more steel partitions 156 may extend vertically from height H2 down to H0, such that the concrete donut structure 150 is formed based on filling portions of the annular gap space 146, at least partially defined by one or more outer surfaces 156o, that are external to the inner laterally-closed spaces 158 only up to a particular height (e.g., H1) while the concrete columns 152 are formed based on filling the inner laterally-closed spaces 158 to at least a height that is above the particular height (e.g., up to height H2).

It will be understood that the one or more steel partitions 156 may comprise, in part or in full, any well-known corrosion resistant steel material, including, for example, "stainless steel" as the term is well-known. In some example embodiments, the one or more steel partitions 156 may comprise, in part or in full, any well-known steel material (e.g., "carbon steel" as the term is well-known) that is coated with any well-known corrosion resistant coating.

In some example embodiments, one or more steel partitions 156 may define an inner laterally-closed space 158 that does not extend completely between the inner surface 144i and the outer surface 142o, such that a concrete column 152 formed in the inner laterally-closed space 158 may not partition the annular gap space 146 into separate coolant channels 160. In some example embodiments, the one or more steel partitions 156 that define such an inner space that does not extend completely between the inner surface 144i and the outer surface 142o may include gaps that do not completely partition the portions of the annular gap space 146 that are outside the inner laterally-closed space 158, such that coolant fluid 179 may flow through the gaps in the one or more steel partitions 156 and around the inner laterally-closed space 158 defined by the one or more steel partitions 156.

Figure 5:
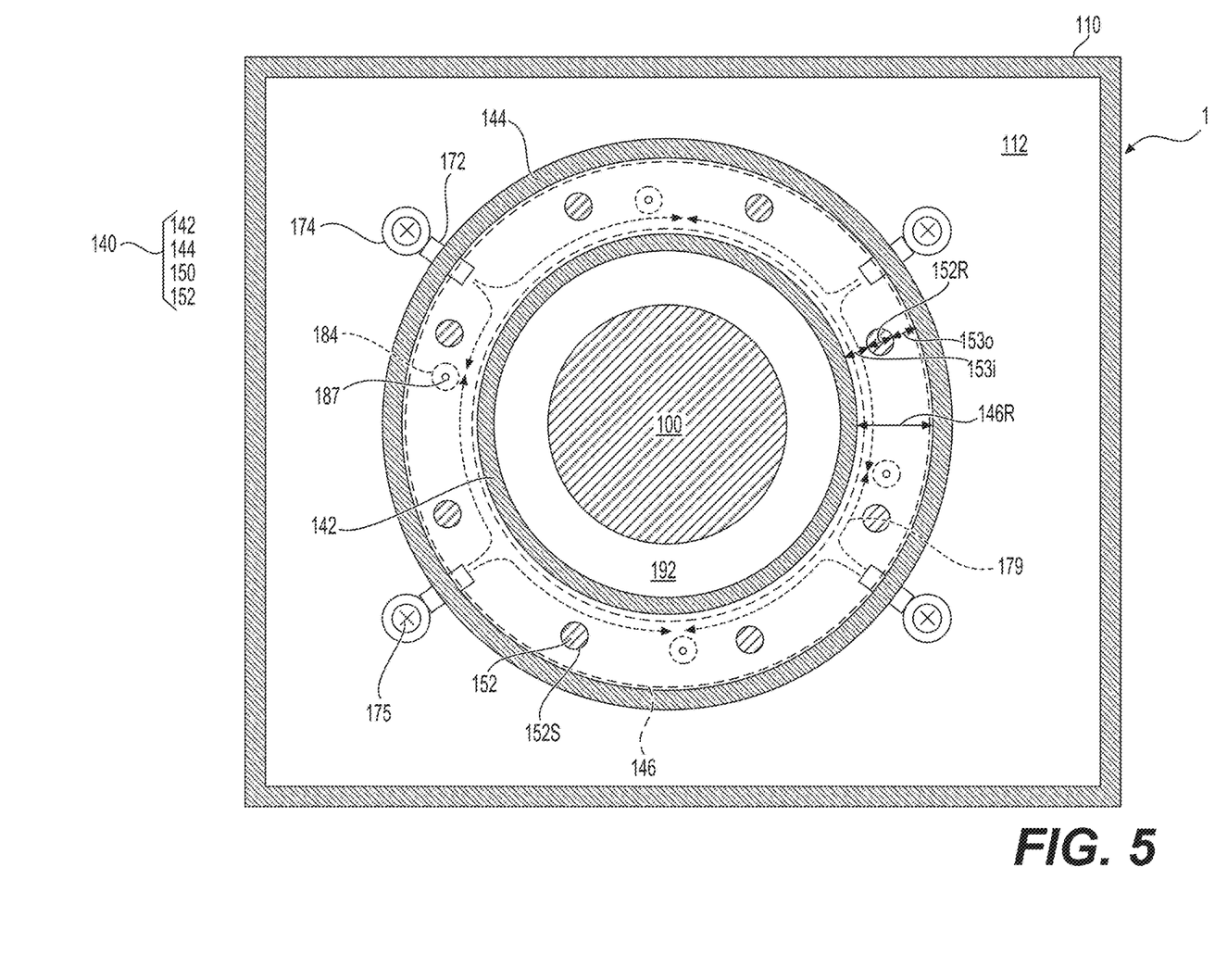
FIG. 5 is a cross-sectional top view of the nuclear plant of FIG. 1 along cross-sectional view line III-III' where the integrated passive cooling containment structure includes support columns with radial widths that are less than the radial distance of the annular gap between the inner diameter and outer diameter of the inner channels of the integrated passive cooling containment structure, according to some example embodiments.

FIG. 5 is a cross-sectional top view of the nuclear plant of FIG. 1 along cross-sectional view line III-III' where the integrated passive cooling containment structure includes support columns with radial widths that are less than the radial distance of the annular gap between the inner diameter and outer diameter of the inner channels of the integrated passive cooling containment structure, according to some example embodiments. It will be understood that like elements from FIGS. 1-4 have the same reference numbers in FIG. 5. Elements of the example embodiments shown in FIG. 5 that are the same or substantially the same as the corresponding like elements shown in any of FIGS. 1-4 will not be described again in detail with regard to FIG. 5 and the above description thereof with regard to any of FIGS. 1-4 will be understood to apply to the example embodiments shown in FIG. 5.

Referring to FIG. 5, in some example embodiments, some (e.g., one or more) or all concrete columns 152 of the containment structure 140 each have a radial diameter 152R, in a radial direction 301R of the annular gap space 146, that is less than the radial distance 146R of the annular gap space 146 between an inner diameter (e.g., the diameter of the outer surface 142o) and an outer diameter (e.g., the diameter of the inner surface 144i) of the annular gap space 146, such that the some or all concrete columns are isolated from directly contacting one or more of the inner steel cylindrical shell 142 or the outer steel cylindrical shell 144. In the example embodiments shown in FIG. 5, all of the concrete columns 152 have a radial diameter 152R that is less than the radial distance 146R, such that all of the concrete columns 152 may be isolated from directly contacting the inner steel cylindrical shell 142 and may further be isolated from directly contacting the outer steel cylindrical shell 144. As shown in FIG. 5, each of the concrete columns 152 having a radial diameter 152R that is less than the radial distance 146R and is isolated from directly contacting the inner steel cylindrical shell 142 may, collectively with the inner steel cylindrical shell 142, define an inward gap space 153i between a radially inward-facing portion of a side surface 152s of the concrete column 152 and the outer surface 142o of the inner steel cylindrical shell 142, such that coolant fluid 179 in the annular gap space 146 may circulate laterally (e.g., azimuthally) around the circumference of the annular gap space 146 and around one or more of the concrete columns 152 via at least the inward gap space 153i. As further shown in FIG. 5, each of the concrete columns 152 having a radial diameter 152R that is less than the radial distance 146R and is isolated from directly contacting the outer steel cylindrical shell 144 may, collectively with the outer steel cylindrical shell 144, define an outward gap space 153o between a radially outward-facing portion of a side surface 152s of the concrete column 152 and the inner surface 144i of the outer steel cylindrical shell 144, such that coolant fluid 179 in the annular gap space 146 may circulate laterally (e.g., azimuthally) around the circumference of the annular gap space 146 and around one or more of the concrete columns 152 via at least the outward gap space 153o.

In some example embodiments, one or more of the concrete columns 152 shown in FIG. 5 may have a different radial diameter 152R at different vertical heights in the annular gap space. In some example embodiments, one or more of the concrete columns 152 may have a conical shape, truncated conical shape, or the like, such that the radial diameter 152R of the one or more concrete columns 152 changes, gradually and/or in step increments, with increasing height of the concrete column 152 cross-section between height H1 and height H2. As a result, in some example embodiments, the concrete columns 152 may have a radial diameter 152R, at height H1, that equals the radial distance 146R at height H1 (e.g., similarly to the cross-sectional view shown in FIGS. 3-4) so that the concrete columns 152 azimuthally partition the annular gap space 146 into separate coolant channels 160 at height H1, while the concrete columns 152 may have a radial diameter 152R at or near height H2 (e.g., between height H2 and a height H2' that is between H1 and H2) that is less than the radial distance 146R at height H2 (where radial distance 146R may be fixed at a constant value at some or all heights between height H1 and height H2), such that the separate coolant channels 160 defined by the concrete columns 152 at height H1 may merge, at or near height H2 (e.g., between height H2 and a height H2' that is between H1 and H2), into a single, annular coolant channel 160 that extends around the concrete columns 152 at or near height H2.

In some example embodiments, the inner steel cylindrical shell 142, the outer steel cylindrical shell 144, and/or one or more steel partitions 156 may partially or fully comprise one or more metal materials that are different from one or more steel materials. For example, in some example embodiments, the inner steel cylindrical shell 142, the outer steel cylindrical shell 144, and/or one or more steel partitions 156 may partially or fully comprise one or more titanium materials.

Figure 6:
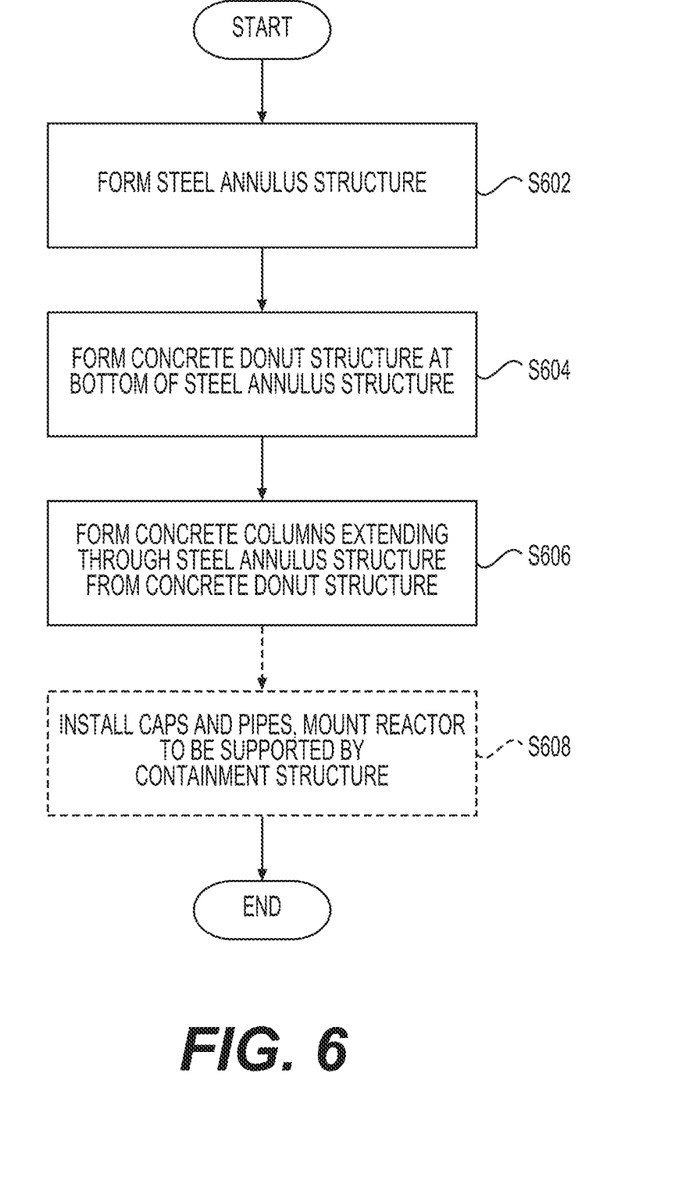
FIG. 6 is a flowchart that illustrates a method of installing a nuclear reactor that includes an integrated passive cooling containment structure, according to some example embodiments.

FIG. 6 is a flowchart that illustrates a method of installing a nuclear reactor that includes an integrated passive cooling containment structure, according to some example embodiments. The method shown in FIG. 6 may be performed with regard to any of the example embodiments of containment structures 140 as described herein, including any of the example embodiments shown in FIGS. 1-5.

At S602, the method may include forming a steel annulus structure that includes a concentric arrangement of an inner steel cylindrical shell 142 and an outer steel cylindrical shell 144, where inner surface 142i of the inner steel cylindrical shell 142 at least partially defines a lateral boundary of a containment environment 192 of a nuclear reactor 100, and where an outer surface 142o of the inner steel cylindrical shell 142 and an inner surface 144i of the outer steel cylindrical shell 144 define inner and outer diameters, respectively, of an annular gap space 146 between the inner steel cylindrical shell 142 and the outer steel cylindrical shell 144. In some example embodiments, forming the steel annulus structure may include separately mounting the shells 142, 144 sequentially on foundation 2, where the shells 142, 144 are separately formed off-site. In some example embodiments, forming the steel annulus structure may include bending one or more pieces of steel to form one or both of the shells 142, 144, such that one or both of the shells 142, 144 may be formed on-site at the nuclear plant 1.

In some example embodiment, forming the steel annulus structure may include installing one or more steel partitions 156 in the annular gap space 146 to define an inner laterally-closed space 158. The one or more steel partitions 156 may define the inner laterally-closed space 158 to extend from at least a height H2 (e.g., the height of the top 146a of the annular gap space 146) down to at least a lower height H1 (which will subsequently be a height of a top surface 154 of a concrete donut structure 150) and, in some example embodiments, may further extend down to height H0 that is the height of the top surface 2t of the foundation 2. In some example embodiments, installing a steel partition 156 in the annular gap space 146 may include coupling the steel partition 156 to one or more of the inner steel cylindrical shell 142, the outer steel cylindrical shell 144, or one or more other steel partitions 156 via any well-known method for joining metal pieces, including welding, riveting, any combination thereof, or the like.

As noted above, the steel annulus structure, including the inner steel cylindrical shell 142, the outer steel cylindrical shell 144, and any steel partitions 156, may include one or more pieces of steel material, including one or more pieces of corrosion resistant steel (e.g., stainless steel), one or more pieces of steel covered with one or more corrosion-resistant coatings, any combination thereof, or the like.

At S604, a concrete donut structure 150 is formed at a bottom 146b of the annular gap space 146, such that the concrete donut structure 150 fills a lower region 146L of the annular gap space 146. The forming of the concrete donut structure 150 may include pouring concrete into the angular gap space 146 until the height of the concrete donut structure 150 rises to height H1.

The forming of the concrete donut structure 150 may include pouring a single stream of concrete into the angular gap space 146, for example when the space between H0 and H1 in the angular gap space is a continuous, partitioned space (e.g., when the annular steel structure does not include a steel partition 156 that extends to height H0. The forming at S604 may include pouring a self-consolidating concrete material into the annular gap space 146 to form the concrete donut structure 150.

In some example embodiments, for example where the portion of the angular gap space 146 between height H0 and H1 are partitioned by one or more steel partitions that extend at least partially or fully between H1 and H0, the forming of the concrete donut structure 150 may include pouring a multiple, separate streams of concrete into separate portions of the angular gap space 146, including or example one or more inner laterally-closed spaces 158 that are located within the angular gap space 146 between H0 and H1 and defined by one or more steel partitions 156 extending at least partially between H1 and H0, such that the formed concrete donut structure 150 includes one or more pieces of concrete formed within one or more portions of the angular gap space 146, including two or more partitioned portions of the angular gap space 146 (e.g., including portions of the angular gap space 146 between heights H0 and H1 that are both within and external to one or more spaces 158 defined by one or more steel partitions 156 extending at least partially between heights H1 and H0. The forming at S604 may include pouring multiple streams of self-consolidating concrete material into separate portions of the annular gap space 146 to form the concrete donut structure 150.

At S606, a plurality of concrete columns 152 are formed in the angular gap space 146 such that the concrete columns 152 are spaced apart azimuthally, symmetrically or asymmetrically, around a circumference of the annular gap space 146 and extending in parallel from a top surface 154 of the concrete donut structure 150 to a top 146a of the annular gap space 146 (e.g., between at least heights H1 and H2), such that the outer steel cylindrical shell 144, the inner steel cylindrical shell 142, the plurality of concrete columns 152, and the concrete donut structure 150 at least partially define one or more coolant channels 160 in the annular gap space 146, where the one or more coolant channels 160 extend from a bottom 160b at the top surface 154 of the concrete donut structure 150 to a top 160a at the top 146a of the annular gap space 146.

In some example embodiments, the concrete columns 152 may be fabricated separately and off-site and lowered into the annular gap space 146 and onto the top surface 154 of the concrete donut structure 150. In some example embodiments, for example where the steel annulus structure includes one or more steel partitions 156 that define a inner laterally-closed space 158 within the angular gap space 146, a concrete column 152 may be formed based on filling the inner laterally-closed space 158 based on pouring concrete into the inner laterally-closed space 158 to fill the space 158 (e.g., from height H1 to height H2) with concrete. In some example embodiments, a concrete column 152 may be formed in an inner laterally-closed space 158 concurrently with, or immediately after, pouring concrete into one or more annular gap space 146 to form a concrete donut structure 150, such that a concrete column 152 that is formed at S606 is part of a piece of concrete that also comprises at least a portion of the concrete donut structure 150 and/or extends between height H1 at least partially or fully to height H0 so that a bottom surface of a piece of concrete that comprises all of the concrete column 152 is lower (e.g., closer to height H0) than the height (e.g., H1) of the top surface 154 of the concrete donut structure 150.

At S608, one or more coolant supply ports 172 are installed (e.g., inserted through one or more corresponding holes extending through a thickness of the outer steel cylindrical shell 144) at a bottom 160b of the one or more coolant channels 160, such that the one or more coolant supply ports 172 are configured to couple with a coolant source 202 via one or more coolant supply conduits 174, such that the one or more coolant supply ports 172 are configured to direct a supply coolant fluid 175 into the bottom region 160c of the one or more coolant channels 160 such that the coolant fluid 175/179 rises through the one or more coolant channels 160 towards a top 160a of the one or more coolant channels 160, according to a change in coolant fluid buoyancy based on the coolant fluid 179 absorbing heat 102 rejected from the nuclear reactor 100 in the containment environment 192 via the inner steel cylindrical shell 142. Installing a coolant supply port 172 my include drilling a hole through the thickness of the outer steel cylindrical shell 14 and inserting and securing the coolant supply port 172 in the hole so as to seal the hole to reduce or prevent leakage of coolant fluid from the one or more coolant channels 160 through an interface between the coolant supply port 172 and the outer steel cylindrical shell 144. In some example embodiments, the one or more coolant supply ports 172 may be installed during the forming of the steel annular structure at S602 and prior to the forming of the concrete donut structure 150 at S604.

In some example embodiments, S608 includes coupling a cap structure 182 to the top surface and/or edges of the inner and outer steel cylindrical shells 142, 144 to cause the cap structure 182 to seal the top 146a of the annular gap space 146 to define the top 160a of the one or more coolant channels 160. The cap structure may include one or more coolant return ports 184 configured to direct coolant fluid 179 flowing to the top 160a of the one or more coolant channels 160 to a coolant return 204 via one or more coolant return conduits 186.

In some example embodiments, S608 include mounting the nuclear reactor 100 in a containment environment 192 at least partially defined by the inner surface 142i such that the nuclear reactor 100 is structurally supported in the containment environment 192 by the containment structure 140 via at least the concrete donut structure 150. For example, S608 may include coupling one or more support projections 194 to the concrete donut structure 150 and/or inner steel cylindrical shell 142, mounting a pedestal 196 to rest on the support projections 194, and mounting the nuclear reactor 100 on the pedestal such that the structural load (e.g., weight) of the nuclear reactor 100 is transferred to the foundation 2 via at least the concrete donut structure 150.

In some example embodiments, S608 includes coupling the cap structure 101 to the containment structure 140 to complete the defining of the containment environment 192.

In some example embodiments, S608 includes constructing the reactor building structure 110 and/or a superstructure 120 of the nuclear plant 1 over the containment structure 140 such that the containment structure 140 at least partially structurally supports the superstructure 120 (e.g., structurally supports the superstructure 120 alone or in combination with the reactor building structure 110). In some example embodiments, S608 includes installing one or more coolant supply conduits 174, coolant return conduits 186, coolant source 202, coolant return 204, reservoir 206, one or more portions of the reactor building structure 110, any combination thereof, or the like.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims. In addition, while processes have been disclosed herein, it should be understood that the described elements of the processes may be implemented in different orders, using different selections of elements, some combination thereof, etc. For example, some example embodiments of the disclosed processes may be implemented using fewer elements than that of the illustrated and described processes, and some example embodiments of the disclosed processes may be implemented using more elements than that of the illustrated and described processes.

The invention claimed is:

1. An integrated passive cooling containment structure, comprising:
    a concentric arrangement of an inner steel cylindrical shell and an outer steel cylindrical shell, an inner surface of the inner steel cylindrical shell defining a lateral boundary of a containment environment that is configured to accommodate a nuclear reactor, an outer surface of the inner steel cylindrical shell and an inner surface of the outer steel cylindrical shell defining inner and outer diameters, respectively, of an annular gap space between the inner steel cylindrical shell and the outer steel cylindrical shell;
    a concrete donut structure at a bottom of the annular gap space, such that the concrete donut structure fills a lower region of the annular gap space; and
    a plurality of concrete columns spaced apart azimuthally around a circumference of the annular gap space and extending in parallel to a top of the annular gap space,
    wherein the outer steel cylindrical shell, the inner steel cylindrical shell, the plurality of concrete columns, and the concrete donut structure at least partially define one or more coolant channels in the annular gap space, the one or more coolant channels extending from a top surface of the concrete donut structure to the top of the annular gap space,
    wherein the outer steel cylindrical shell includes one or more coolant supply ports at a bottom of the one or more coolant channels, the one or more coolant supply ports configured to couple with a coolant source via one or more coolant fluid supply conduits, such that the one or more coolant supply ports are configured to direct a coolant fluid into a bottom region of the one or more coolant channels such that the coolant fluid rises through the one or more coolant channels towards a top of the one or more coolant channels, according to a change in coolant fluid buoyancy based on the coolant fluid absorbing heat rejected from the containment environment via the inner steel cylindrical shell,
    wherein two or more concrete columns, of the plurality of concrete columns, each have a radial diameter, in a radial direction of the annular gap space, that equals a radial distance of the annular gap space between an inner diameter and an outer diameter of the annular gap space over at least a portion of a vertical height of each of the two or more concrete columns, such that the two or more concrete columns azimuthally partition at least a portion of the annular gap space into two or more isolated coolant channels that extend vertically through at least the portion of the annular gap space, and
    wherein the outer steel cylindrical shell includes two or more coolant supply ports that are each configured to direct coolant fluid into a separate coolant channel of the two or more isolated coolant channels.

2. The integrated passive cooling containment structure of claim 1, further comprising:
    one or more steel partitions isolating a concrete column of the plurality of concrete columns from an adjacent coolant channel of the one or more coolant channels.

3. The integrated passive cooling containment structure of claim 1, further comprising:
    a cap structure that seals the top of the annular gap space to define the top of the one or more coolant channels, the cap structure including one or more coolant outlet ports configured to direct coolant flowing to the top of the one or more coolant channels to a coolant return via one or more coolant return conduits.

4. The integrated passive cooling containment structure of claim 1, wherein the plurality of concrete columns and the concrete donut structure are a single, uniform piece of concrete.

5. The integrated passive cooling containment structure of claim 1, wherein the plurality of concrete columns and the concrete donut structure each include self-consolidating concrete.

6. The integrated passive cooling containment structure of claim 1, wherein the inner steel cylindrical shell and the outer steel cylindrical shell each include corrosion resistant steel or steel coated with a corrosion resistant coating.

7. A nuclear plant, comprising:
    a reactor building structure;
    the integrated passive cooling containment structure of claim 1, wherein the integrated passive cooling containment structure is located within an interior of the reactor building structure and defines a void space between the reactor building structure and an exterior of the integrated passive cooling containment structure; and
    a nuclear reactor located within the containment environment that is at least partially defined by the inner surface of the inner steel cylindrical shell of the integrated passive cooling containment structure.

8. The nuclear plant of claim 7, wherein
    the integrated passive cooling containment structure further includes a cap structure that seals the top of the annular gap space to define the top of the one or more coolant channels, the cap structure including one or more coolant outlet ports configured to direct coolant flowing to the top of the one or more coolant channels to a coolant return via one or more coolant return conduits; and
    the nuclear plant further includes a coolant reservoir that is both the coolant source and the coolant return.

9. A method for forming an integrated passive cooling containment structure, the method comprising:

forming a steel annulus structure, the steel annulus structure including a concentric arrangement of an inner steel cylindrical shell and an outer steel cylindrical shell, an inner surface of the inner steel cylindrical shell defining a lateral boundary of a containment environment that is configured to accommodate a nuclear reactor, an outer surface of the inner steel cylindrical shell and an inner surface of the outer steel cylindrical shell defining inner and outer diameters, respectively, of an annular gap space between the inner steel cylindrical shell and the outer steel cylindrical shell;

forming a concrete donut structure at a bottom of the annular gap space, such that the concrete donut structure fills a lower region of the annular gap space;

forming a plurality of concrete columns spaced apart azimuthally around a circumference of the annular gap space and extending in parallel to a top of the annular gap space, such that the outer steel cylindrical shell, the inner steel cylindrical shell, the plurality of concrete columns, and the concrete donut structure at least partially define one or more coolant channels in the annular gap space, the one or more coolant channels extending from a top surface of the concrete donut structure to the top of the annular gap space, such that two or more concrete columns, of the plurality of concrete columns, each have a radial diameter, in a radial direction of the annular gap space, that equals a radial distance of the annular gap space between an inner diameter and an outer diameter of the annular gap space over at least a portion of a vertical height of each of the two or more concrete columns, such that the two or more concrete columns azimuthally partition at least a portion of the annular gap space into two or more isolated coolant channels that extend vertically through at least the portion of the annular gap space, and the outer steel cylindrical shell includes two or more coolant supply ports that are each configured to direct coolant fluid into a separate coolant channel of the two or more isolated coolant channels; and installing one or more coolant supply ports at a bottom of the one or more coolant channels, the one or more coolant supply ports configured to couple with a coolant source via one or more coolant fluid supply conduits, such that the one or more coolant supply ports are configured to direct a coolant fluid into a bottom region of the one or more coolant channels such that the coolant fluid rises through the one or more coolant channels towards a top of the one or more coolant channels, according to a change in coolant fluid buoyancy based on the coolant fluid absorbing heat rejected from the containment environment via the inner steel cylindrical shell.

10. The method of claim 9, wherein the forming the steel annulus structure includes installing one or more steel partitions in the annular gap space to define an inner laterally-closed space, that extends from the top surface of the concrete donut structure to the top of the annular gap space, within the annular gap space, and the forming the plurality of concrete columns includes filling the inner laterally-closed space with concrete to form one concrete column of the plurality of concrete columns.

11. The method of claim 9, further comprising:

mounting the nuclear reactor in the containment environment such that the nuclear reactor is structurally supported in the containment environment by the integrated passive cooling containment structure via at least the concrete donut structure.

* * * * *